United States Patent [19]

Ikenaga et al.

[11] Patent Number: 5,396,640
[45] Date of Patent: Mar. 7, 1995

[54] BOOSTING METHOD AND APPARATUS IN A PARALLEL COMPUTER

[75] Inventors: Chikako Ikenaga; Hideki Ando, both of Itami, Japan

[73] Assignee: Mitsubishi Denki Kabushiki Kaisha, Tokyo, Japan

[21] Appl. No.: 883,948

[22] Filed: May 15, 1992

[30] Foreign Application Priority Data

Jul. 16, 1991 [JP] Japan .................................. 3-203980

[51] Int. Cl.$^6$ .............................................. G06F 15/16
[52] U.S. Cl. ...................................... 395/800; 395/375; 364/DIG. 1; 364/231.8; 364/261.3
[58] Field of Search ........................ 395/375, 800, 775

[56] References Cited

U.S. PATENT DOCUMENTS

| | | | |
|---|---|---|---|
| 4,891,753 | 1/1990 | Budde et al. | 395/375 |
| 5,123,108 | 6/1992 | Olson et al. | 395/800 |
| 5,150,469 | 9/1992 | Jouppi | 395/375 |
| 5,155,843 | 10/1992 | Stamm et al. | 395/575 |
| 5,185,868 | 2/1993 | Tran | 395/375 |
| 5,251,306 | 10/1993 | Tran | 395/375 |

OTHER PUBLICATIONS

Horowitz et al, "MIPS-X: A 20-MIPS Peak, 32-Bit Microprocessor With On-Chip Cache", IEEE Hournal of Solid-State Circuits, vol. SC-22, No. 5, 1987, pp. 790-799.

Smith et al, "Boosting Beyond Static Scheduling In A Superscalar Processor", IEEE Procedures of the 17th Annual International Symposium on Computers, 1990, pp. 344-354.

Patterson et al, "Computer Architecture-A Quantitative Approach", pp. 290-299.

Johnny K. F. Lee, "Branch Prediction Strategies and Branch Target Buffer Design", Computer, Jan. 1984, pp. 6-22.

"New Approach to Eliminate Branch Cost in Pipeline Super Computers", IBM Technical Disclosure Bulletin, vol. 33, No. 3B, Aug. 1990, pp. 452-456.

*Primary Examiner*—Alyssa H. Bowler
*Assistant Examiner*—Mehmet Geckil
*Attorney, Agent, or Firm*—Leydig, Voit & Mayer

[57] ABSTRACT

A parallel computer having a boosting function in which an instruction belonging to a later basic block is moved to a precedent basic block in an instruction group, the moved basic block being a branch instruction. The moved instruction and an instruction in the precedent basic block are arranged in parallel in the order of an instruction code. Therefore, the number of boosted instructions which can be executed in parallel is increased and the degree of parallelization of instruction is increased so that the function of the computer is improved.

2 Claims, 16 Drawing Sheets

F I G. 1(a)
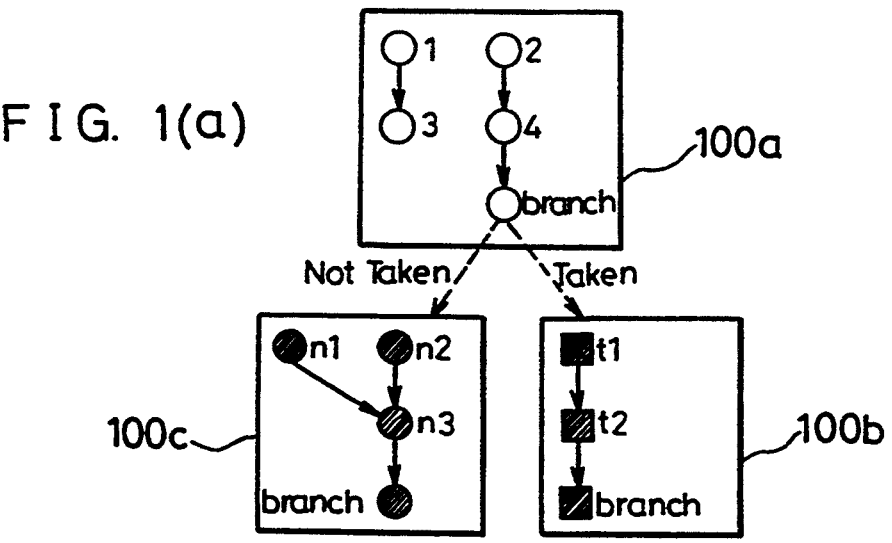
F I G. 1(b)
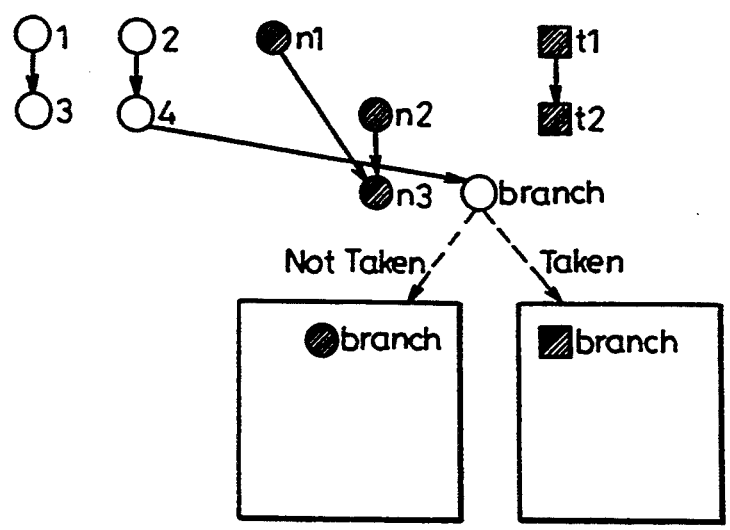

FIG. 2
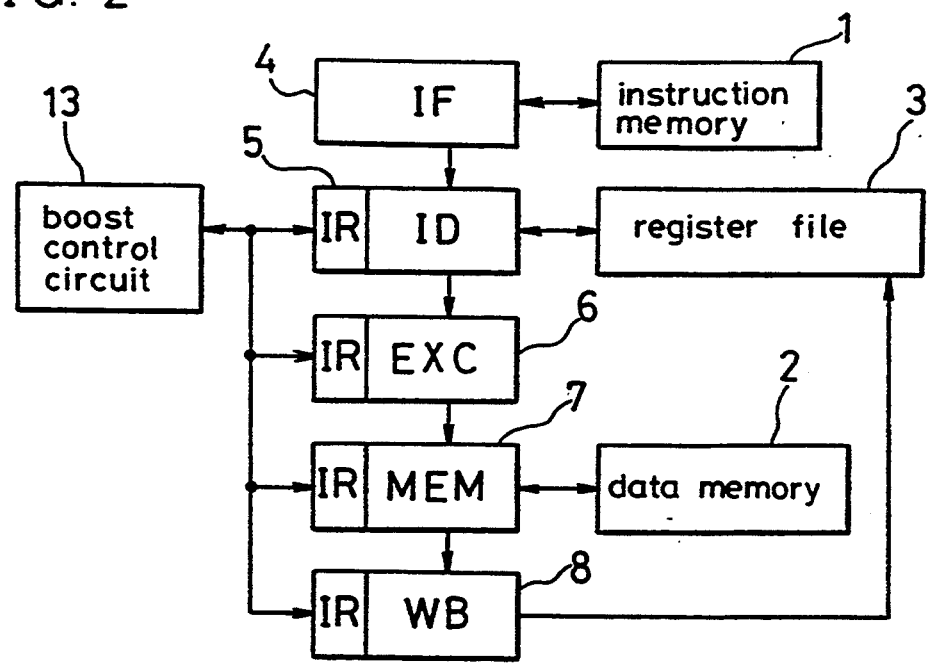
FIG. 3
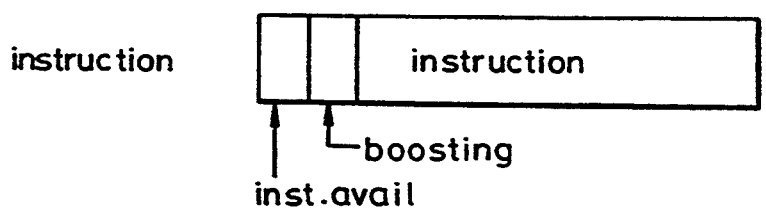
FIG. 4
| not boosted instruction | no extension |
|---|---|
| boosted instruction from not-taken side | ".n" |
| boosted instruction from taken side | ".t" |

FIG. 7(a)

boosted instruction from taken side

| bunki | **.inst.avail.off | **.boost.off |
|---|---|---|
| not decided | 0 | 0 |
| taken | 0 | 1 |
| not taken | 1 | x (don,t care) |

FIG. 7(b)

boosted instruction from not-taken side

| bunki | **.inst.avail.off | **.boost.off |
|---|---|---|
| not decided | 0 | 0 |
| taken | 1 | x |
| not taken | 0 | 1 |

FIG. 8(a)

boosted instruction from taken side

| bunki | **.inst.avail.off | **.boost.off |
|---|---|---|
| taken | 0 | 1 |
| not taken | 1 | x (don,t care) |

FIG. 8(b)

boosted instruction from not-taken side

| bunki | **.inst.avail.off | **.boost.off |
|---|---|---|
| taken | 1 | x |
| not taken | 0 | 1 |

FIG. 10
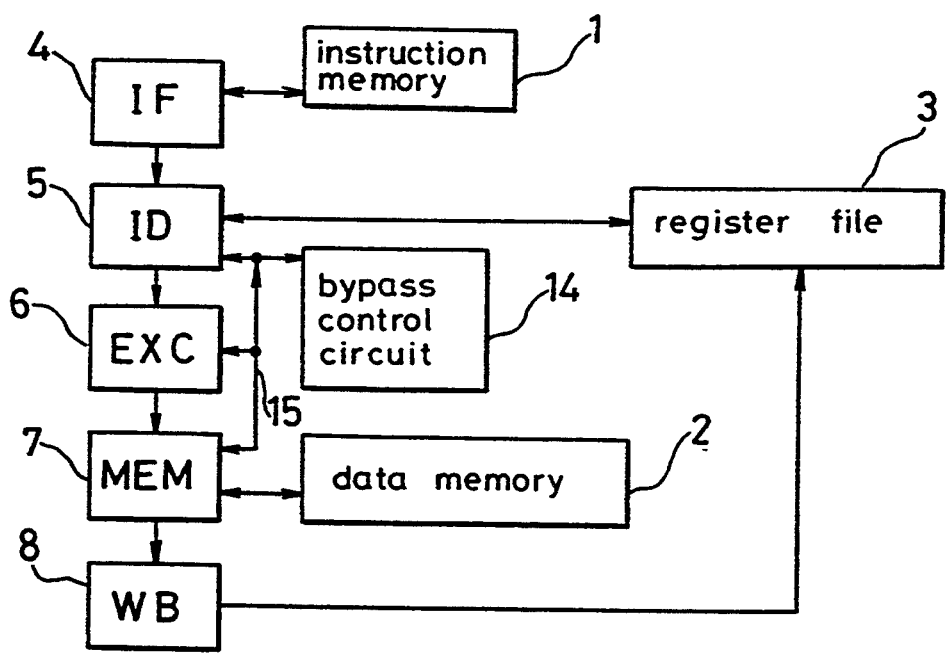
FIG. 11
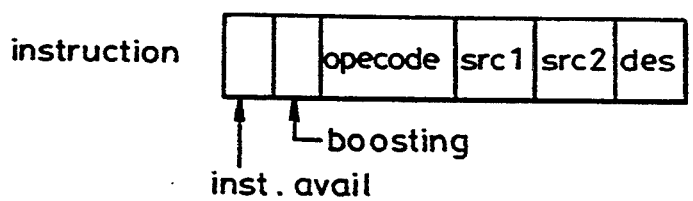
FIG. 12
| output side \ reference side | not-boost | not-taken | taken |
|---|---|---|---|
| not-boost | ○ | ○ | ○ |
| not-taken | × | ○ | × |
| taken | × | × | ○ |
○ : bypass    × : bypass not required F I G. 13
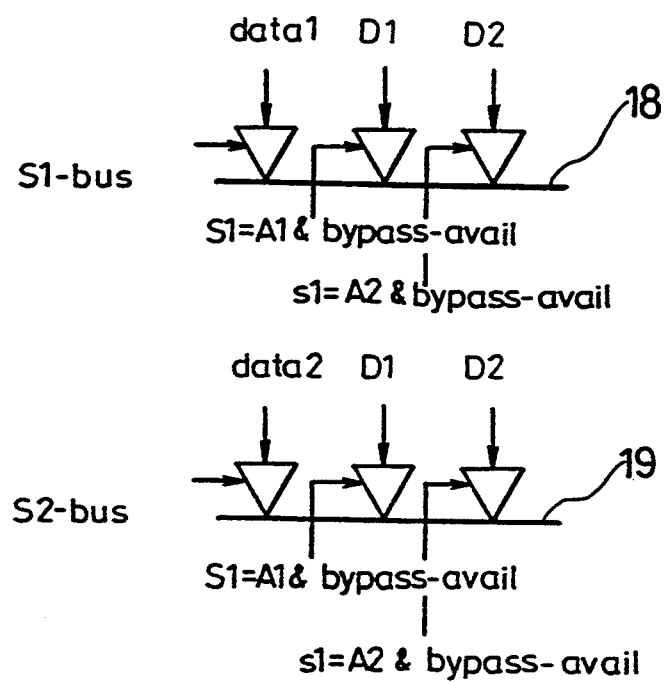

| instruction \ score board | for not-boost | for not-boost | for not-boost |
|---|---|---|---|
| not-boost | ○ | ○ | ○ |
| not-taken | × | ○ | × |
| taken | × | × | ○ |

○: registration   ×: cancel of registration

| instruction \ score board | for not-boost | for not-boost | for not-boost |
|---|---|---|---|
| not-boost | O | × | × |
| not-taken | × | O | × |
| taken | × | × | O |

O : correct    × : incorrect

BOOSTING METHOD AND APPARATUS IN A PARALLEL COMPUTER

FIELD OF THE INVENTION

The present invention relates to a parallel computer capable of executing a plurality of instructions in parallel and, more particularly, to a parallel computer in which a boosting system which executes a branch instruction in advance is improved, and a parallel computer capable of bypass control and score boarding of reference data in which boosting is performed.

BACKGROUND OF THE INVENTION

As the degree of parallelization of instructions in a computer is increased, more instructions can be executed at the same time. However, it is said that the number of instructions contained in a basic block, that is, the number of instructions from one branch to another branch is about four, so that it is difficult to increase the degree of parallelization of instructions. A system in which the degree of parallelization of instruction is increased to effectively use a computer, for example, is disclosed in IEEE International Symposium Computer Architecture Proceedings, May, 1990. In the boosting system an instruction belonging to a later basic block of a certain basic block is moved to a precedent basic block and an instruction in the precedent basic block and the moved instruction (which is referred to as a boosted instruction hereinafter) are executed in parallel in the order provided by an instruction code, so that the boosted instruction can be executed in advance, validating or invalidating the result of the execution of the boosted instruction in accordance with whether the precedent basic branch is taken or not.

FIGS. 19(a) and 19(b) are graphs of the data dependencies of the conventional boosting system, in which FIG. 19(a) is a graph before boosting and FIG. 19(b) is a graph after boosting. Reference numerals 100a, 100b and 100c each designate a basic block which is a unit from one branch instruction to another branch instruction. The later basic block 100b or 100c is taken in response to a branch instruction of the precedent basic block 100a. FIG. 20 is a view showing architecture of a parallel computer performing the conventional boosting. In FIG. 20, reference numeral 1 designates an instruction memory storing an instruction and reference numeral 2 designates a data memory storing data. Reference numerals 3a and 3b designate a register file and a shadow register file, respectively, which are memories for storing data temporarily and are accessed from the instruction decode stage 5 and the write back stage 8. An instruction fetch stage 4 fetches the instruction from the instruction memory 1. An instruction decode stage 5 decodes the fetched instruction and sends the instruction to an execution stage 6 if the instruction can be executed, that is, issues the instruction. The execution stage 6 performs an address calculation for execution of an operation instruction and memory access. A memory access stage 7 executes a load or a store instruction. A write back stage 8 rewrites a result of the operation and leads data into the register file. Reference numerals 9a and 9b designate a store buffer and a shadow store buffer, respectively, which are memories for temporarily storing addresses and data stored in the data memory 2.

FIG. 21 is a view showing a two-phase clock which provides operation timing of the parallel computer. A single stage operation is performed every cycle shown in FIG. 21.

The conventional boosting is performed on the basis of the following rules. That is, (1) the instruction which can be boosted is a memory access instruction and an operation instruction, (2) it should be clearly shown whether it is the boosted instruction in an instruction code, and (3) boosting is performed from either the later basic block of a taken branch or the later basic block of a not-taken branch.

One characteristic of the hardware for implementing the boosting is duplication of a register file and a store buffer as shown in FIG. 20. Referring to FIG. 20, the conventional hardware comprises a register file 3a, a shadow register file 3b, a store buffer 9a and a shadow store buffer 9b. Thus, the boosted instruction which is invalidated by a result of the branch, that is, the ineffective boosted instruction which should not be executed in fact is executed as an undecided boosted instruction at a stage in which the branch is not yet taken, so that a storage state is not changed.

A change of the storage state by the undecided boosted instruction is not written in the register file and the store buffer but written in the shadow register file and the shadow store buffer. Data written in the shadow side is validated when the direction of branch is decided.

FIG. 22 is a view showing bypass operation of a conventional computer in a pipeline system. In FIG. 22, the same reference numbers as in FIG. 20 designate the same or corresponding parts. In addition, reference numeral 10 designates a bypass selection circuit for controlling a bus 11 for bypassing data of each stage by the execution stage 6.

FIG. 23 is a view showing a circuit in the pipeline. In FIG. 23, reference numeral 21 designates a register file, reference numeral 22 designates an address comparator, reference numerals 23 and 24 designate first and second destination storing registers which store destination addresses of output data of the instructions of the execution stage and the memory access stage, respectively, reference numeral 26 designates an operation executing part, reference numerals 27 and 28 designate first and second data registers which store the operational results of the execution stage and the memory access stage, respectively and reference numeral 25 designates a selector circuit for selecting data.

FIG. 24 is a view showing an example of a circuit in the address comparator 22. Source addresses src1 and src2 applied from the instruction decoder and addresses A1 and A2 of destinations of preceding instructions are input to the address comparator, in which the src1 is compared with the destination addresses A1 and A2 or the src2 is compared with the A1 and A2 and then a signal for controlling the selector circuit, which whether these addresses coincide, is output from it.

FIG. 25 is a view showing an example of a structure of the selector circuit 25. In FIG. 25, reference numerals 18 and 19 designate busses for selecting input data from operating parts. More specifically, a bus (s1-bus) 18 transfers data s1-data to the operation executing part and a bus (s2-bus) 19 transfers data s2-data to the operation executing part. In the selector circuit, in accordance with a control signal, when the addresses coincide, the coincident address data is selected as data output to the buses s1-bus and s2-bus. When all of the control signals for controlling selection of data output to the s1-bus do not coincide, the data data1 supplied from the register file 21 is selected. In addition, when all of the control signals for controlling selection of data output to the s2-bus do not coincide, data data2 supplied from the register file 21 is selected.

The source addresses src1 and src2, which are addresses of two reference data from the instruction decoder, and the destination addresses A1 and A2 of the output data of the preceding instructions stored in the first and second destination storing registers 23 and 24 are applied to the address comparator 22 in which these addresses are compared and the control signal is output to the data selector circuit 25. The data1 and data2 output from the register file 21 and data D1 and D2 stored in the first and second data registers 27 and 28 are input to the data selector circuit 25 and data s1-data and s2-data to be input to the operation executing part 26 are selected in accordance with the control signal applied from the address comparator part 22 in the data selector circuit 25. Thus, the data of each stage is bypassed to the instruction stage.

FIG. 26 is a view showing a structure for explaining a score boarding function of a conventional computer of a pipeline system. In FIG. 26, the same reference numbers as in FIGS. 20 and 22 designate the same or corresponding parts. In addition, reference numeral 12 designates a score board, which has a memory for controlling data in the register file and comprises its control circuit.

As shown in FIG. 26, writing into the register file 3 is performed at the end of execution. Therefore, when instruction data whose execution is not yet completed is used by the following instruction, wrong data could be used. In order to avoid this, score boarding is provided in the register file of the pipeline system computer. The writing instruction in the register file puts a mark on the score board (registration) so that the following instruction may not read the register and incorrect data which is not the newest may not be used. When the writing is completed, the mark on the score board is canceled (registration cancel).

FIG. 27 is a view showing a structure of the score board. Operation of the score board will be described hereinafter. A reading address and a writing address of the register are input to the score board from the instruction decode stage. A mark is put on the register in which writing is performed in accordance with the input data so that data in the register may not be used by the following instruction. In addition, whether the register to be read is locked is checked in reading the data of the register and a data correction or incorrection signal is output in accordance with registered and unregistered data. Further, the writing address is received from the write back stage and when the writing is completed, the mark on the score board is erased and then registration is canceled.

According to the structure of the conventional parallel computer described above, since boosting is performed from either a later basic block of a taken branch or a later basic block of a not-taken branch, the number of instructions which can be boosted is few, so that the degree of parallelization of instruction can not be sufficiently improved. In addition, as the number of the operating parts is increased to increase the degree of parallelization of instructions, the size of the hardware becomes larger. The size of the hardware becomes larger because the conventional parallel computer has duplicate register files, store buffers and the like to implement boosting. Consequently, it can not be put in a chip.

In addition, bypass control of a conventional computer in which the boosting is not performed is performed only in accordance with the result of a comparison between the source address and the destination address as described above, so that it can not cope with boosting.

Further, the score board of the conventional computer in which boosting is not performed is structured as described above, so that it can not cope with boosting.

SUMMARY OF THE INVENTION

It is an object of the present invention to improve the degree of parallelization of instructions of a parallel computer.

It is another object of the present invention to minimize hardware of a parallel computer in which boosting is performed.

It is a still another object of the present invention to implement a data bypass in a computer using a boosting system.

It is a still further object of the present invention to implement score boarding in a computer using a boosting system.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

In a parallel computer in accordance with the present invention, boosting is performed from both a later basic block of a taken branch and later basic block of a not-taken branch. Therefore, the number of boosted instructions, which are executed in parallel, can be increased and the degree of parallelization of instructions is increased, so that the function of the computer can be improved.

In addition, in a parallel computer in accordance with the present invention, the range where boosting can be performed is limited so that the number of cycles from a position where a boosted instruction is inserted until a branch is taken may be equal to or less than the number of cycles until a stage where the boosted instruction rewrites a storing state. Therefore, it is not necessary to have duplicate register files and store buffers because no memory is rewritten by an ineffective instruction. As a result, the hardware can be minimized and the control circuit can be simplified.

Further, a parallel computer of the present invention, in which an instruction of a later basic block is boosted to a precedent basic block, comprises an address comparator circuit for comparing an address of reference data with an address of output data of a preceding instruction and outputting a first control signal showing whether the addresses coincide; a boost comparator circuit for comparing a boosting bit showing whether the instruction on the side where the data is referred is the boosted instruction with a boosting bit showing whether a preceding instruction is the boosted instruction and then outputting a second control signal by which data of the preceding instruction which is not the boosted instruction is referred when the instruction on the side where the data is referred is not the boosted instruction or data of the preceding instruction whose kind is the same as that of the boosted instruction and data of the preceding instruction which is not the boosted instruction is referred when the instruction on the side where the data is referred is the boosted instruction; and a data selector circuit for selecting data in accordance with the first and second control signals. Therefore, bypass of data can be implemented in the computer in the boosting system.

In addition, a parallel computer of the present invention, in which the instruction of the later block is boosted to the precedent basic block, comprises a score board for instruction as to which is not the boosted instruction and for the boosted instruction; a score board control circuit in which the score board is registered or canceled in response to the kind of the instruction and the score board for boosted instruction corresponding to the direction of the branch, when the branch is determined, is validated and its contents are added to the score board for instruction which is not the boosted instruction and the state of all score boards are made the same; and a data correction or incorrection signal generator circuit which outputs an incorrection signal when the register to be read is registered and a correction signal when it is not registered in reference to the score board corresponding to the kind of the instruction. Thus, score boarding can be implemented in the computer using the boosting system.

BRIEF DESCRIPTION OF THE DRAWINGS

FIG. 1(a-b) is a view showing a graph of the data dependencies of a boosting system of a parallel computer in accordance with a first embodiment of the present invention;

FIG. 2 is a view showing architecture of the parallel computer in accordance with the first embodiment of the present invention;

FIG. 3 is a view showing a structure of an instruction register of the parallel computer in accordance with the first embodiment of the present invention;

FIG. 4 is a view showing an example of an instruction code used in the parallel computer in accordance with the first embodiment of the present invention;

FIG. 7(a-b) is a view showing a control relation between an instruction effective bit and a boosting bit of an instruction decode stage, an execution stage and a memory access stage;

FIG. 8(a-b) is a view showing a control relation between an instruction effective bit and a boosting bit of a write back stage;

FIG. 10 is a view showing architecture of the parallel computer in accordance with the second embodiment of the present invention;

FIG. 11 is a view showing a structure of an instruction register used in the second embodiment of the present invention;

FIG. 12 is a view showing a logical table of a boost comparator circuit;

FIG. 13 is a view showing a circuit in a data selector circuit of the parallel computer in accordance with a second embodiment of the present invention;

DETAILED DESCRIPTION OF THE PREFERRED EMBODIMENTS

Figure 5:
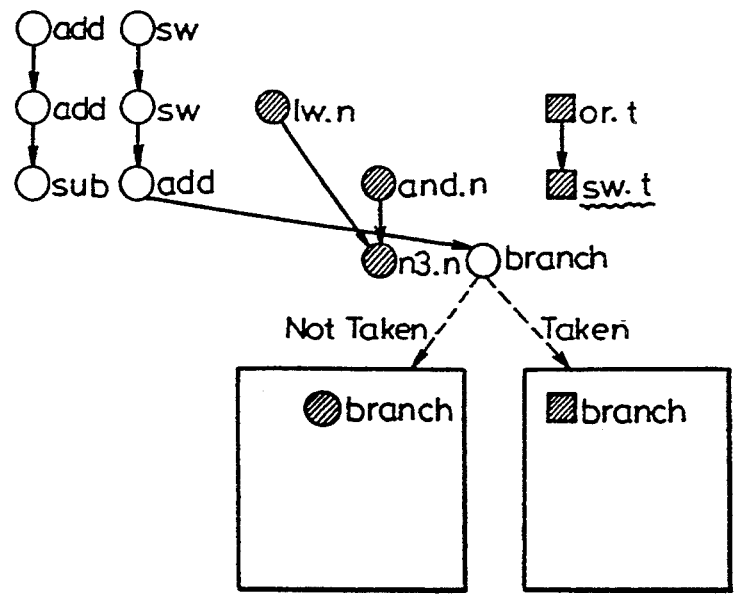
FIG. 5 is a view for describing a range where a boosted instruction can be put in the parallel computer in accordance with the first embodiment of the present invention.

An embodiment of the present invention will be described in detail with reference to the drawings hereinafter.

FIGS. 1(a) and 1(b) are graphs of the data dependencies of a boosting system of a parallel computer in accordance with a first embodiment of the present invention, in which FIG. 1(a) is a graph before boosting and FIG. 1(b) is a graph after boosting. Reference numerals 100a, 100b and 100c each designate a basic block which is a unit from one branch instruction to another branch instruction. The later basic block 100b or 100c is taken by the branch instruction of the precedent basic block 100a.

FIG. 2 is a view showing architecture of the parallel computer in accordance with the first embodiment of the present invention. In FIG. 2, reference numeral 1 designates an instruction memory storing an instruction and reference numeral 2 designates a data memory storing data. Reference numeral 3 designates a register file temporarily storing data. The register file 3 comprises a memory and can be accessed from an instruction decode stage 5 and a write back stage 8. An instruction fetch stage 4 fetches an instruction from the instruction memory. An instruction decode stage 5 decodes a fetched instruction and sends the instruction to the next execution stage 6 if the instruction can be executed. The execution stage 6 executes an operation instruction and performs address calculation for memory access. A memory access stage 7 executes a load or store instruction. A write back stage 8 writes back an operation result and loads data into the register file. A boost control circuit 13 invalidates a boosted instruction and controls boosting. In addition, FIG. 3 is a view showing the structure of the instruction register used in this embodiment of the present invention.

Boosting in this embodiment is performed on the basis of the following rules. That is, (1) instructions which can be boosted are a memory access instruction and an operation instruction, (2) it should be clearly shown whether the boosted instruction is on the taken side or on the not-taken side in an instruction code, and (3) the range where boosting can be performed is limited so that the number of cycles from a position where a boosted instruction is put until a branch is taken is equal to or less than the number of cycles to a stage where the boosted instruction rewrites into a memory. More specifically, it is limited to two cycles before the cycle where the branch is taken in a case of a memory load instruction or a operation instruction and it is limited to one cycle before the cycle where the branch is taken in a case of a memory store instruction.

In order to implement rule (2), for example an extension may be added to the instruction code as shown in FIG. 4.

FIG. 5 shows an example in which boosting is performed on the basis of the rule (3). As shown in FIG. 5, a store instruction sw.t of the later basic block is not put more than one cycle before a branch instruction "o branch" of the precedent basic block and the load instruction lw.n, the operation instruction or.t or the like is not put more than two cycles before the branch instruction "o branch" of the precedent basic block. Since the range where the boosted instruction is put is limited as described above, the branch result is determined before the boosted instruction is rewritten the memory, so that an ineffective, i.e., unused, instruction will not be rewritten in the memory. Therefore, it is not necessary to duplicate the register file and the storage buffer, so that the hardware can be minimized and the control circuit can be simplified.

Figure 6:
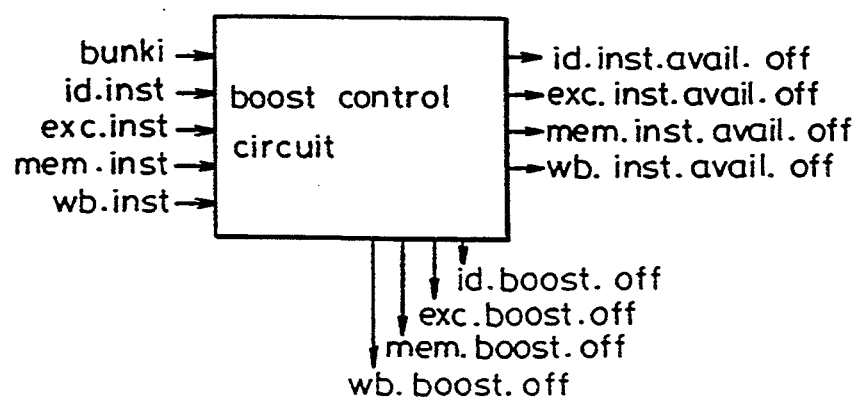
FIG. 6 is a view showing a boost control circuit of the parallel computer in accordance with the first embodiment of the present invention.

Next, operation of a boost control circuit will be described. FIG. 6 is a view showing the operation of the boost control circuit. A signal "bunki" which shows whether the branch is not determined or determined on the taken side or on the not-taken side and contents (id.inst, exc.inst, mem.inst and wb.inst) of the instruction register of the instruction decode stage, the execution stage, the memory access stage and the write back stage are applied to the boost control circuit from the instruction decode stage. The boost control circuit outputs a signal id.inst.avail.off which shows that the instruction of the instruction decode stage becomes ineffective in accordance with FIG. 7 (in a case of the boosted instruction from the basic block in which the branch is determined but the instruction is not executed) by the contents (id.inst) of the instruction register of the instruction decode stage and the signal "bunki", and also outputs the signal id.boost.off which turns off a boosting bit (when the branch is determined). In addition, it outputs a signal exc.inst.avail.off, mem.inst.avail.off and wb.inst.avail.off which show that the instruction of each instruction register becomes ineffective in accordance with FIGS. 7 and 8 by the contents (exc.inst, mem.inst and wb.inst) of the instruction registers of the execution stage, the memory access stage and the write back stage and also outputs a signal the exc.boost.off, mem.boost.off and wb.boost.off for turning off the boosting bit.

In the instruction decode stage which received the output signal of the boost control circuit, an instruction is not issued because id.inst.avail.off is on, that is, the direction of branch is determined and then it is not necessary to execute the boosted instruction. In addition, in a case where id.boost.off is on, the boosting bit of the instruction is turned off. In addition, in the execution stage, the memory access stage and the write back stage, the instruction is invalidated and the boosting bit of the instruction is turned off in accordance with the output signal.

As described above, according to this embodiment of the present invention, since the instruction is boosted from both the taken basic block and the not-taken basic block, the degree of parallelization of instruction can be improved.

Figure 9:
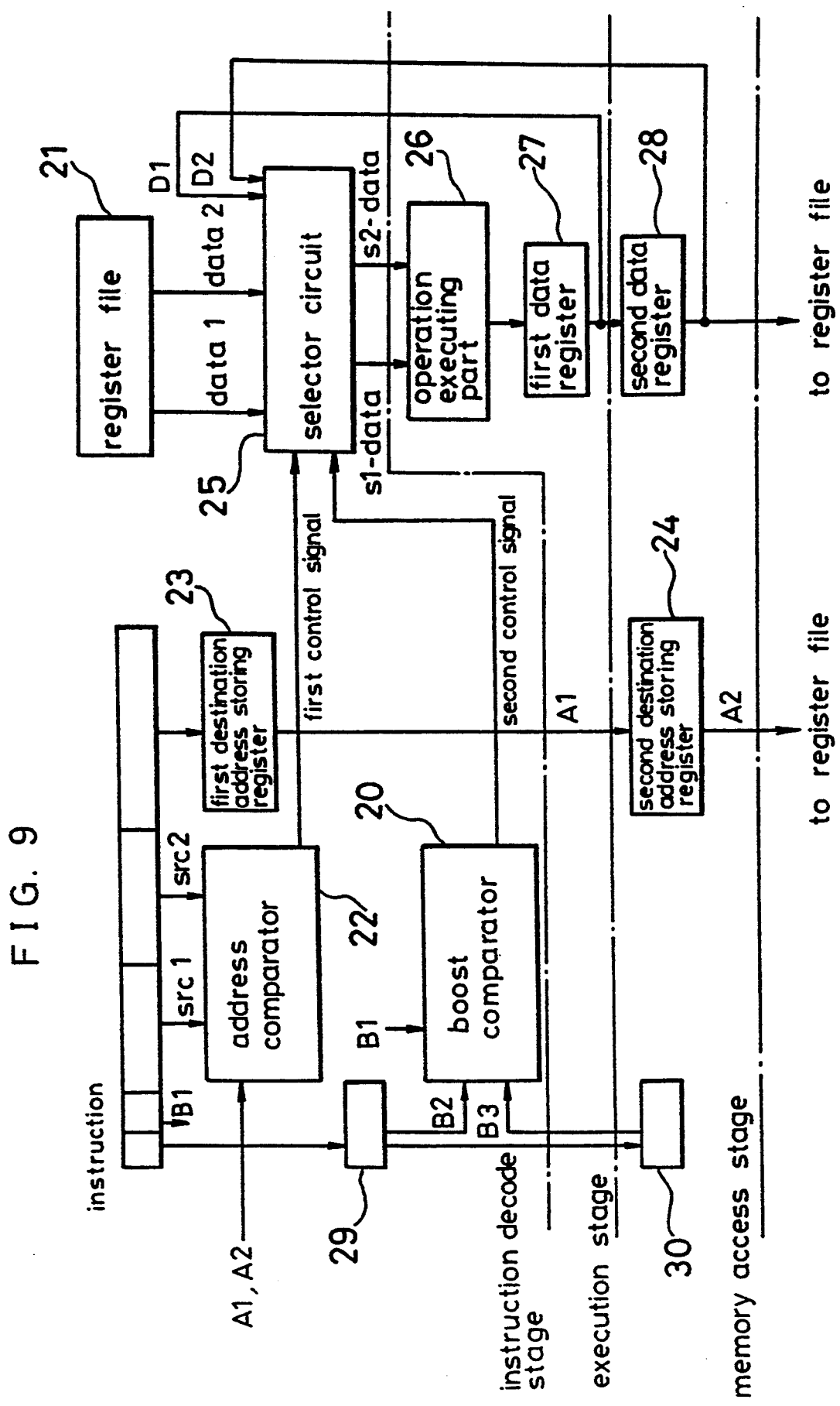
FIG. 9 is a view showing a circuit in a parallel computer in accordance with a second embodiment of the present invention.

Next, a second embodiment of the present invention will be described. FIG. 9 is a view showing a circuit in a pipeline-type of a parallel computer in accordance with the second embodiment of the present invention. In FIG. 9, reference numeral 21 designates a register file, and reference numeral 22 designates an address comparator part. First and second destination address storing registers 23 and 24 store destination addresses which are storing addresses of the output data of the instructions of the execution stage and the memory access stage, respectively. Reference numeral 26 designates an operation executing part, reference numerals 27 and 28 designate first and second data registers which store operation results of the execution stage and the memory access stage, respectively, and reference numeral 25 designates a selector circuit of data. In addition, reference numeral 20 designates a boost comparator part and reference numerals 29 and 30 designate first and second instruction storing registers which store the instructions of the execution stage and the memory access stage, respectively.

FIG. 10 is a view showing architecture of the parallel computer in accordance with the second embodiment of the present invention. In FIG. 10, the same reference numbers as in FIG. 2 designate the same or corresponding parts. A bypass control circuit 14 controls a bus 15 for bypassing the data of each stage by the execution stage. The parallel computer of this embodiment performs boosting in the same way as that of the computer in accordance with the first embodiment of the present invention.

FIG. 11 is a view showing the structure of an instruction register used in this embodiment.

The bypass in this embodiment is controlled in the data selector circuit 25 in accordance with the first control signal, which shows coincidence or non-coincidence of the addresses, from the address comparator circuit 22 and the second control signal from the boost comparator circuit 20 for the boosted instruction.

Operation of the address comparator circuit 22 is the same as that of the prior art. More specifically, source addresses src1 and src2 applied from the instruction decoder and addresses A1 and A2 of destinations of the preceding instructions are input and the src1 and src2 are compared with each of the destination addresses A1 and A2 and a signal, which shows whether the addresses coincide, for controlling the selector circuit.

In addition, in the boost comparator circuit 20, boosting bits B2 and B3 of the preceding instructions stored in the instruction registers 29 and 30, respectively, are compared with a boosting bit B1 of the instruction referring to the register file and then a signal (bypass-avail), which determines that the data should be bypassed or not in accordance with the logic shown in FIG. 12, is generated.

FIG. 13 is a view showing a circuit in the data selector circuit used in this embodiment of the present invention. In the data selector circuit 25, in accordance with the first control signal from the address comparator circuit 22 and the second control signal (bypass-avail) from the boost comparator circuit 20, bypass data is selected when the addresses coincide and the bypass-avail shows that the bypass data should be referred (bypass-avail=1). The bypass data is not referred when the addresses do not coincide or the bypass-avail shows that the bypass data should not be referred.

As described above, according to this embodiment of the present invention, the address of the reference data is compared with the address of the output data of the preceding instruction in the address comparator circuit and the first control signal showing coincidence or noncoincidence of these addresses is output. The boosting bit of the instruction on the side where the data is referred is compared with the boosting bit of the preceding instruction in the boost comparator circuit, and there is output the second control signal showing that the data of the preceding instruction which is not the boosted instruction should be referred when the instruction of the side where the data is referred is not the boosted instruction and the data of the preceding instruction whose kind is the same as that of the boosted instruction and the data of the preceding instruction which is not the boosted instruction should be referred when the instruction on the side where the data is referred is the boosted instruction. In accordance with these first and second control signals the data is selected in the data selector circuit. Therefore, data bypass can be implemented in the computer using the boosting system.

In addition, although the above embodiments are applied to a parallel computer in which boosting is performed from both taken and not-taken basic blocks, it can be applied to a system in which boosting is performed from only one of them.

Figures 15, 16:
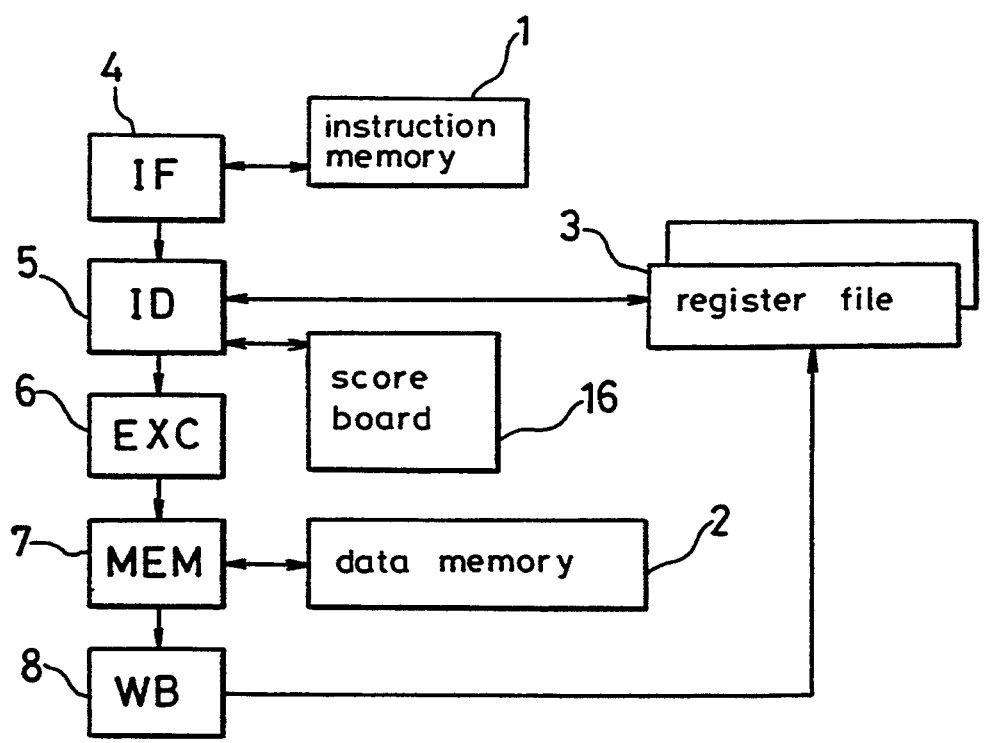
FIG. 15 is a view showing architecture of the parallel computer in accordance with the third embodiment of the present invention.
FIG. 16 is a view showing a logical table of registration and its cancellation for the score board.

Next, a third embodiment of the present invention will be described. FIG. 15 is a view showing architecture of a parallel computer in accordance with the third embodiment of the present invention. In FIG. 15, the same reference numbers as in FIGS. 2 and 10 designate the same or corresponding parts. In addition, reference numeral 16 designates a score board. The instruction decode stage 5 decodes a fetched instruction and sends the instruction to the executing stage 6 when the instruction can be executed and also outputs an instruction operation code, a reading address and branch determination information to the score board. In this case, the instruction decode stage 5 receives a data correction or incorrection signal from the score board 16 and issues the instruction to the execution stage only when the data is correct. The write back stage 8 writes back the operation result of the execution stage 6 and the load data in the memory access stage 7 to the register file 3 and outputs a registration cancel signal showing that the writing to the score board 16 is completed. The score board 16 comprises a memory for controlling the data of the register file and a control circuit of this memory.

In addition, the parallel computer of this embodiment performs boosting in the same way as that of the computer in accordance with the first embodiment of the present invention.

Figure 14:
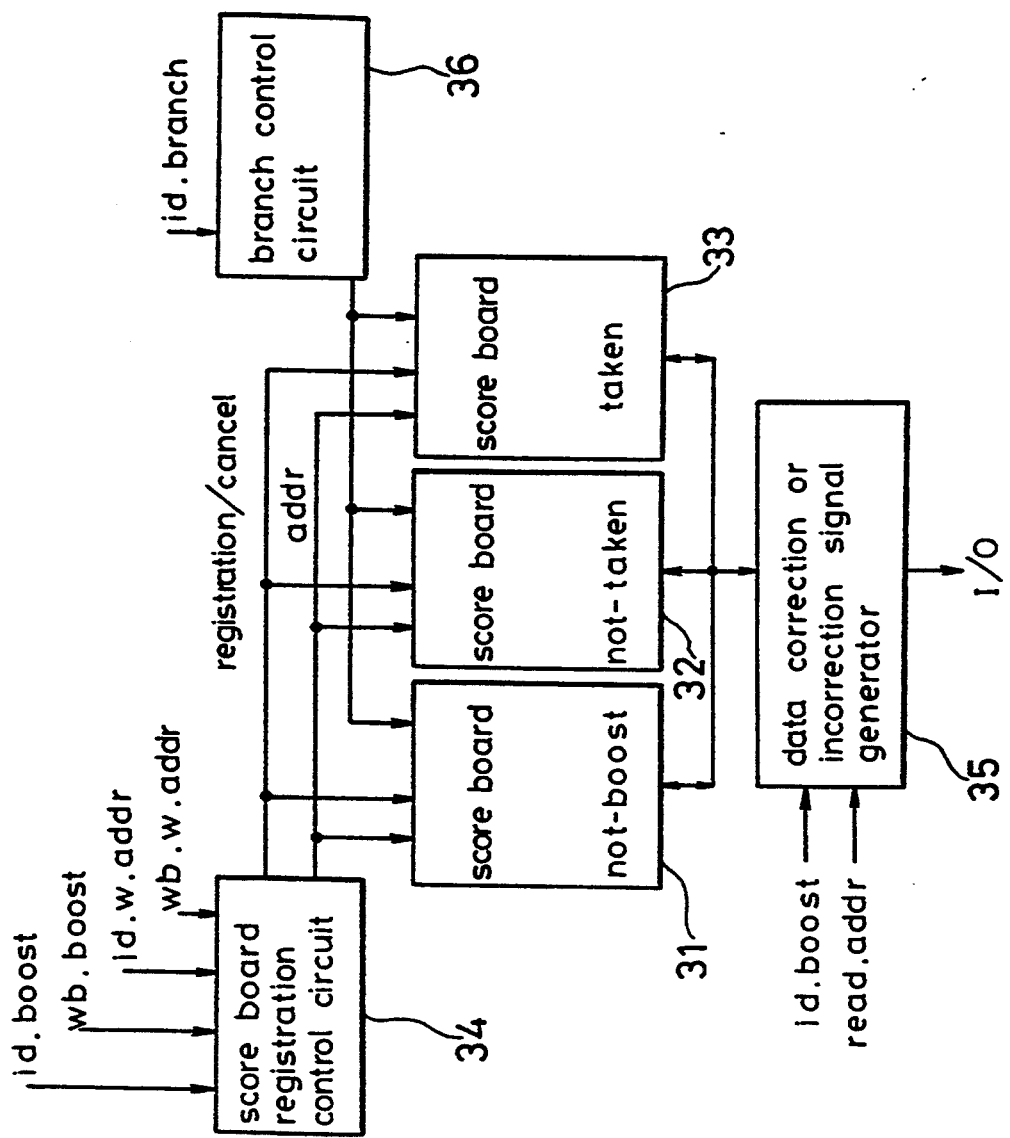
FIG. 14 is a view showing a structure of a score board of a parallel computer in accordance with a third embodiment of the present invention.

FIG. 14 is a view showing a structure of a score board of the parallel computer in accordance with the third embodiment of the present invention. There are three score boards for the instruction 31 which is not the boosted instruction, for the not-taken boosted instruction 32 and for the taken boosted instruction 33 in this embodiment. In addition, reference numeral 34 designates a score board registration control circuit, reference numeral 35 designates a data correction or incorrection signal generator circuit and reference numeral 36 designates a branch control circuit. The score board control circuit comprises the score board registration control circuit 34 and the branch control circuit 36.

Next, operation of each circuit will be described.

Registration and its cancellation on the score board are performed in the score board registration control circuit 34. A boost bit (id.boost) and the writing address (id.w.addr) of the instruction of the instruction decode stage, and the boost bit (wb.boost) and the writing address (wb.w.addr) of the instruction of the write back stage are input to the score board registration control circuit 34. Then, the instruction which is not the boosted instruction, the not-taken boosted instruction and the taken boosted instruction are each registered or canceled toward respective score boards in accordance with FIG. 16.

Figures 17, 18:
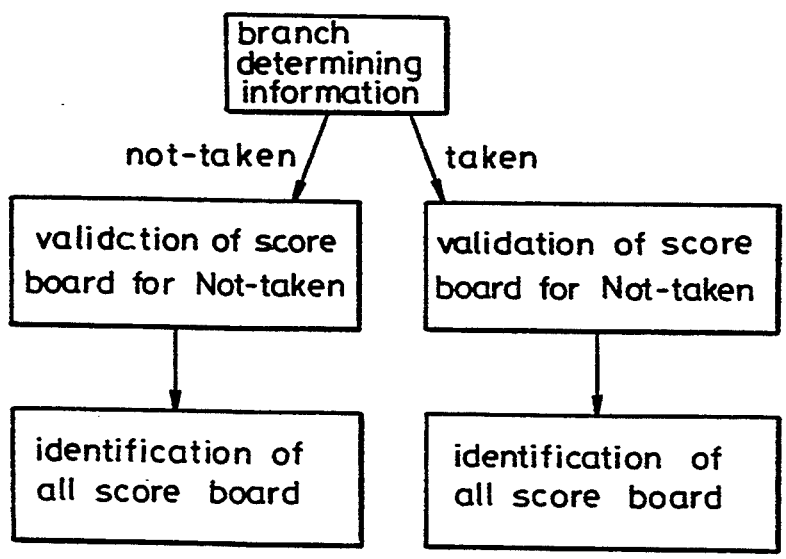
FIG. 17 is a view showing a table of the response of the score board to kinds of instructions.
FIG. 18 is a view showing operation of a branch control circuit when a branch is determined.
Figure 19A:
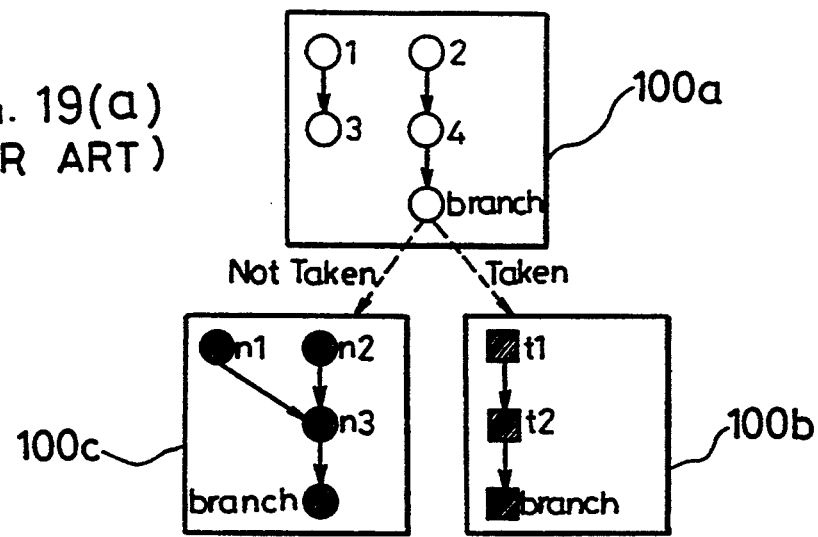
FIG. 19(a-b) is a view showing a graph of the data dependencies of a conventional boosting system.
Figure 19B:
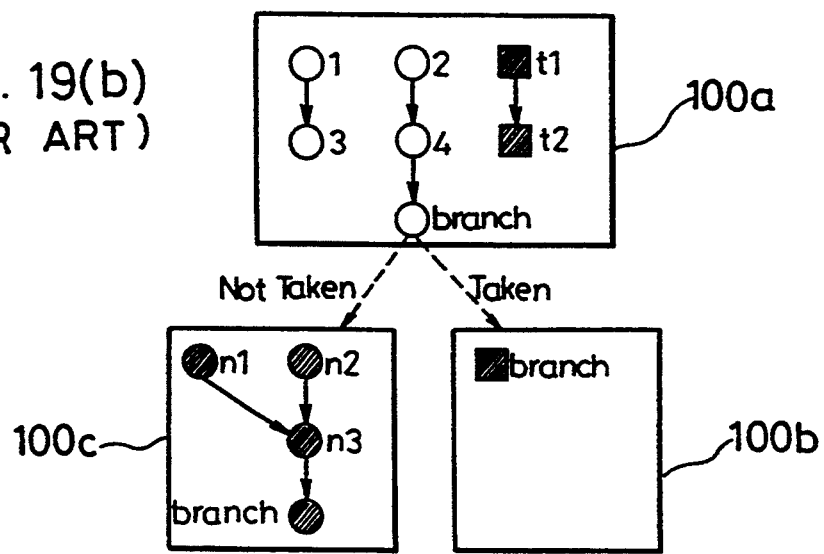
Figure 20:
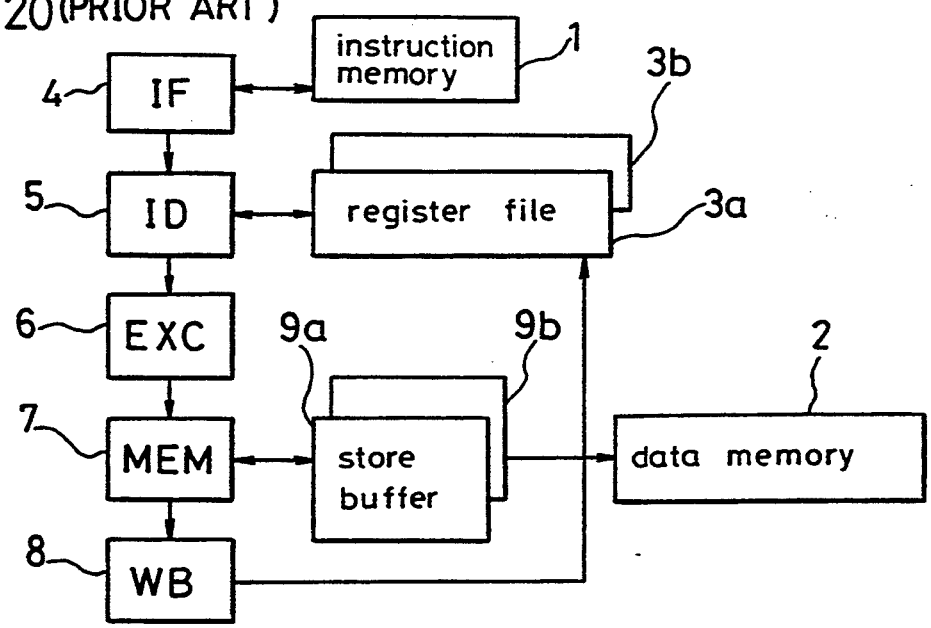
FIG. 20 is a view showing a double structure of a register file and a store buffer.
Figure 21:
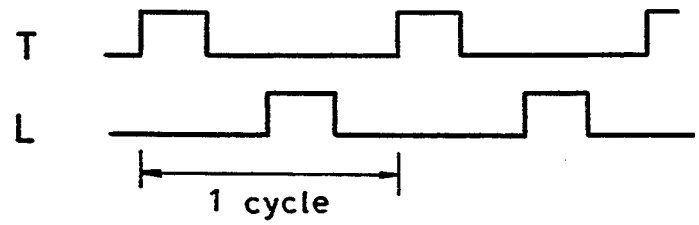
FIG. 21 is a view showing a two-phase clock which provides operation timing to the parallel computer.
Figure 22:
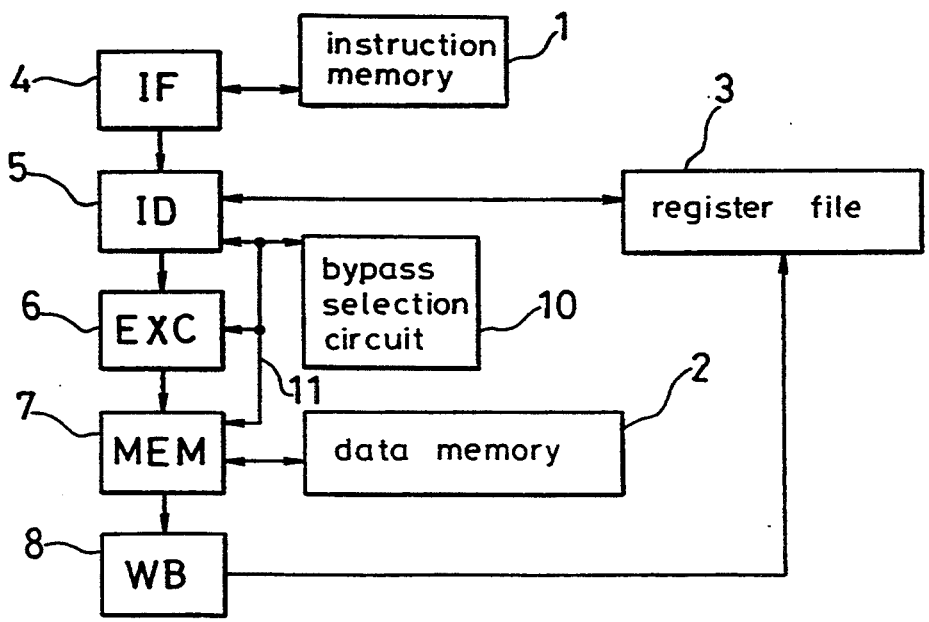
FIG. 22 is a view for describing bypass operation of a conventional computer using a pipeline system.
Figure 23:
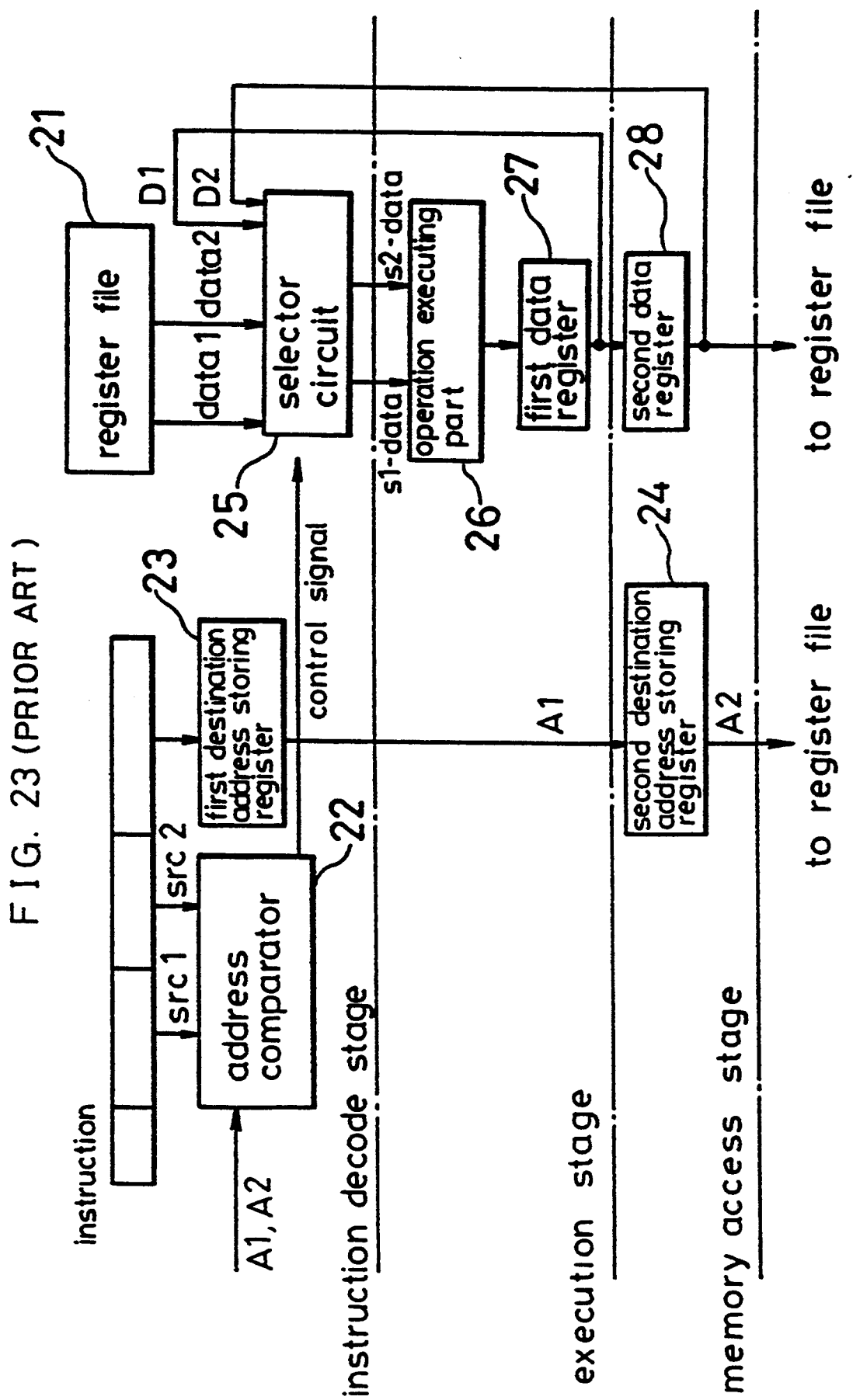
FIG. 23 is a view showing a structure in the pipeline system computer in which the conventional bypass operation is performed.
Figure 24:
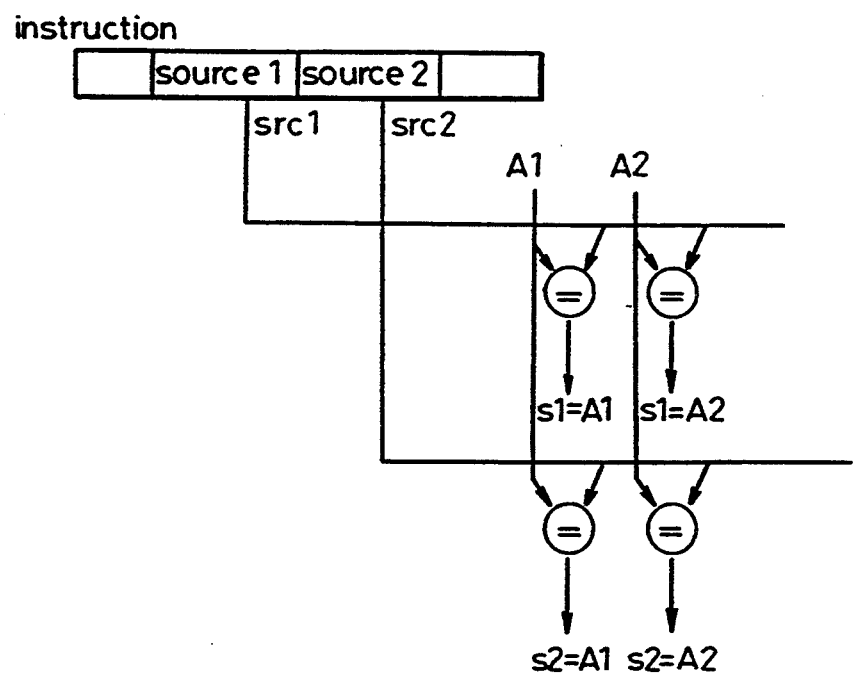
FIG. 24 is a view showing an example of a circuit in an address comparator part.
Figure 25:
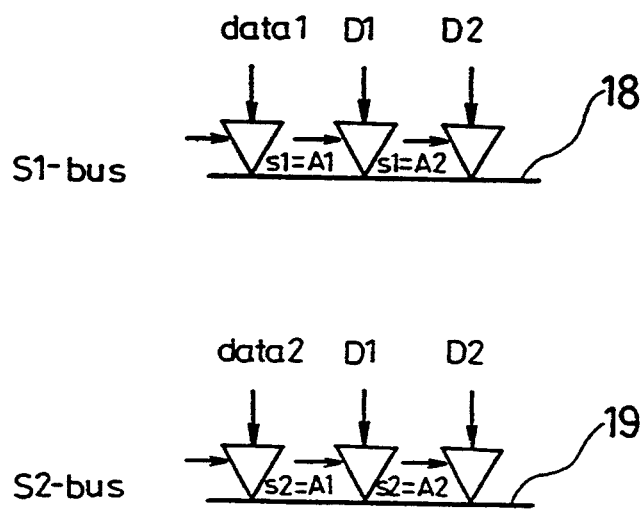
FIG. 25 is a view showing an example of a structure of a selector circuit.
Figure 26:
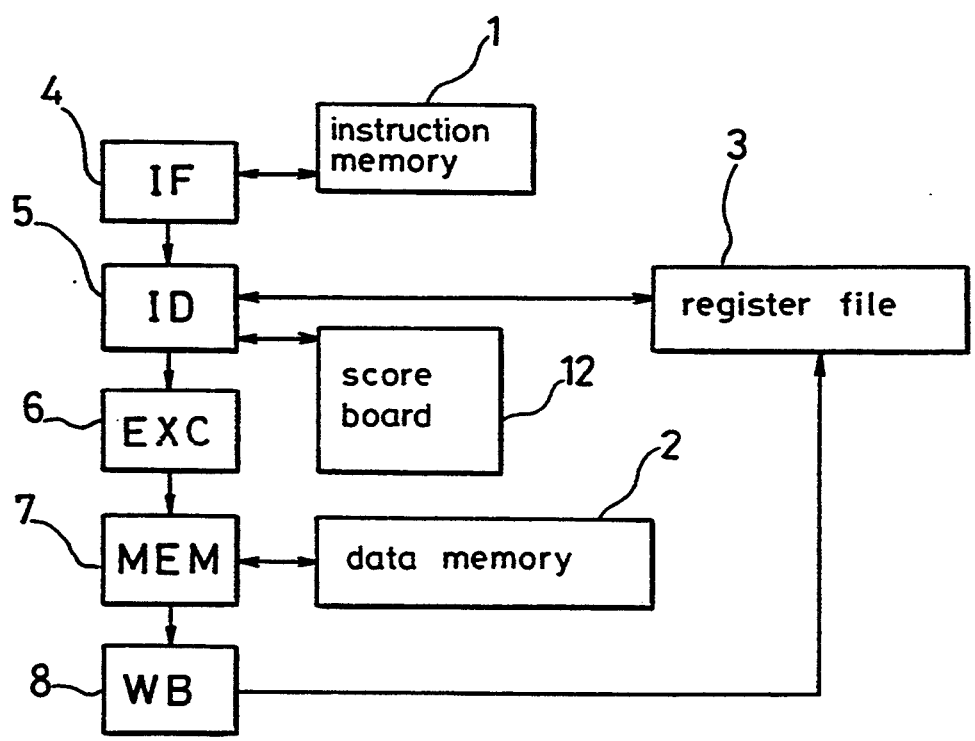
FIG. 26 is a view for describing a score board function of a conventional pipeline system computer.
Figure 27:
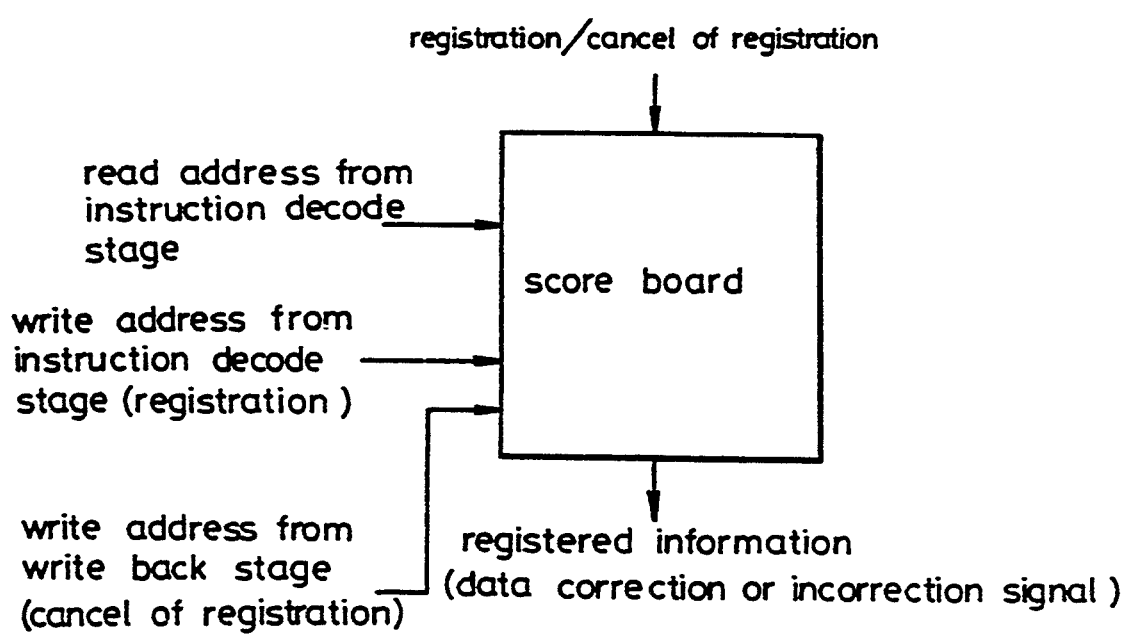
FIG. 27 is a view showing a structure of a conventional score board.

When the instruction is not the boosted instruction (id.boost=0), the data correction or incorrection signal is generated in reference to the score board 31 for the instruction which is not the boosted instruction. When the instruction is the boosted instruction (id.boost=n) on the not-taken side, it is generated in reference to the score board 32 for the boosted instruction on the not-taken side. In addition, when it is the boosted instruction (id.boost=t) on the taken side, it is generated in reference to the score board 33 for the boosted instruction on the taken side. In any case, if the register to be read is registered (referring to the reading address read-,addr), an incorrection signal [1] is output from the data correction or incorrection signal generator circuit 35. Alternatively, if it is not registered, a correction signal [0] is generated from the circuit 35. FIG. 17 shows a corresponding table of the kind of the instruction and the score board to be referred.

When the branch is determined, a branch information signal (id.branch) is applied from the instruction decode stage. When the branch is determined on the not-taken side by the branch control circuit 36, the register registered in the score board 32 for the boosted instruction on the not-taken side is registered in the score board 31 for the instruction which is not the boosted instruction. Then, the score board 32 for the boosted instruction on the not-taken side and the score board 33 for the boosted instruction on the taken side are in the same state as the score board 31 for the instruction which is not the boosted instruction. Alternatively, when the branch is determined on the taken side, the register registered in the score board 32 for the boosted instruction on the taken side is registered in the score board 31 for the instruction which is not the boosted instruction and the score board 32 for the boosted instruction on the not-taken side and the score board 33 for the boosted instruction on the taken side are in the same state as the score board 31 for the instruction which is not the boosted instruction. The above operation is shown in FIG. 18.

As described above, according to this embodiment of the present invention, there are provided three score boards, one for the instruction which is not the boosted instruction, one for the not-taken boosted instruction, and one for the taken boosted instruction. In addition, there is provided a score board control circuit which registers the score boards or cancels registration thereof in accordance with the kind of the instruction, validates the score board for the boosted instruction corresponding to the direction of the branch when the branch is determined, adds its contents to the score board for the instruction which is not the boosted instruction, and places all the score boards in the same state. There is also provided the data correction or incorrection signal generator circuit which outputs an incorrection signal when the register to be read is registered or a correction signal when it is not registered in reference to the score board corresponding to the kind of the instruction. Thus, the score boarding can be implemented in the computer of the boosting system.

In addition, although the above embodiment of the present invention is applied to a parallel computer in which boosting is performed from both taken and not-taken basic blocks, it can be applied to a system in which boosting is performed from either one of them.

As described above, according to the present invention, since there is no limitation in the instruction to be boosted and boosting can be performed from both the basic block of the taken branch and the following not-taken basic block, the number of the boost instructions which can be executed in parallel can be increased. As a result, the degree of parallelization of instructions can be increased and functioning of the computer can be improved.

Further, according to the present invention, since the range where boosting can be performed is limited so that the number of cycles from a position where a boosted instruction is put until a branch is taken may be equal to or less than the number of cycles to a stage where the boosted instruction rewrites a storing state, the memory will not be rewritten by an ineffective instruction and it is not necessary to have duplicate register files and storage buffers. As a result, the hardware can be minimized.

In addition, according to the parallel computer of the present invention in which boosting is performed, the address of the reference data is compared with the address of the output data of the preceding instruction and the first control signal indicating coincidence or non-coincidence of these addresses is output by the address comparator circuit. In addition, in the boost comparator circuit, the boosting bit showing whether the instruction on the side where data is referred is the boosted instruction is compared with the boosting bit showing whether the preceding instruction is the boosted instruction and there is output a second control signal indicating that the data from the preceding instruction, which is not the boosted instruction, should be referred when the instruction of the side where the data is referred is not the boosted instruction and the data of the preceding instruction whose kind is the same as the boosted instruction and the data of the preceding instruction which is not the boosted instruction should be referred when the instruction on the side where the data is referred is the boosted instruction. Then, in accordance with these first and second control signals, the data is selected in the data selector circuit. Thus, data bypass can be implemented in the computer in the boosting system.

Further, according to the parallel computer of the present invention in which boosting is performed, there are provided score boards for the instruction which is not the boosted instruction and for the boosted instruction. Then, registration and its cancellation of the score boards is performed in accordance with the kind of the instruction. The score board for the boosted instruction corresponding to the direction of the branch is validated when the branch is determined and its content are added to the score board for the instruction which is not the boosted instruction and then all the score boards are placed in the same state by the score board control circuit. In addition, an incorrection signal is output when the register to be read is registered or a correction signal is output when it is not registered in reference to the score board corresponding to the kind of the instruction by the data correction or incorrection signal generator circuit. Thus, score boarding can be implemented in a computer with the boosting system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel computer comprising:
   means for executing instructions organized in basic blocks, each basic block including a plurality of linear instructions, each linear instruction providing only one result upon execution, each basic block ending in a branch instruction having two alternative results and selecting one of the alternative results upon execution of the branch instruction, wherein the basic blocks are arranged in sequential order of a precedent basic block and corresponding subsequent basic blocks for sequential execution, each branch instruction of a precedent basic block supplying, upon execution, one of the alternative results to the respective one of the corresponding subsequent basic blocks;
   means for moving the linear instructions of two corresponding subsequent basic blocks, in the sequential order, for parallel rather than sequential execution with linear instructions of the precedent basic block;
   a data bus for communicating data;
   a bypass control circuit for outputting a control signal and indicating whether data on the data bus is used; and
   data selecting means for selecting data in accordance with the control signal.

2. A method of boosting in a parallel computer programmed to execute instructions organized in basic blocks, each basic block including a plurality of linear instructions, each linear instruction providing only one result upon execution, each basic block ending in a branch instruction having two alternative results and selecting one of the alternative results upon execution of the branch instruction, the basic blocks being arranged in sequential order including a precedent basic block and corresponding subsequent basic blocks for sequential execution, each branch instruction of a precedent basic block supplying, upon execution, one of the alternative results to the respective one of the corresponding subsequent basic blocks, the method comprising:

moving the linear instructions of the two corresponding subsequent basic blocks, in the sequential order, for parallel rather than sequential execution with the linear instructions of the precedent basic block;

adding an identifier to each moved linear instruction identifying the respective subsequent basic block from which the linear instructions was moved;

limiting the number of moved linear instructions, wherein execution of the moved linear instructions is completed not later than execution of the branch instruction in the precedent basic block since the alternative result selected by execution of the branch instruction of the precedent basic block is determined before any result of execution of the moved linear instructions is determined, whereby no memory is required for storing the result of execution of the moved linear instructions until the result of execution of the branch instruction of the precedent basic block is determined.

* * * * *